United States Patent
Wang et al.

(10) Patent No.: US 9,469,228 B2
(45) Date of Patent: Oct. 18, 2016

(54) SEAT CLIMATE CONTROL ASSEMBLY AND SEAT EMPLOYING THE SAME

(71) Applicant: FORD GLOBAL TECHNOLOGIES, LLC, Dearborn, MI (US)

(72) Inventors: Luther Wang, Nanjing (CN); Frank Wu, Novi, MI (US); James Eum, Nanjing (CN)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 91 days.

(21) Appl. No.: 14/515,610

(22) Filed: Oct. 16, 2014

(65) Prior Publication Data
US 2015/0274046 A1  Oct. 1, 2015

(30) Foreign Application Priority Data
Mar. 26, 2014  (CN) .......................... 2014 1 0116863

(51) Int. Cl.
*B60N 2/48* (2006.01)
*B60N 2/56* (2006.01)

(52) U.S. Cl.
CPC ............... *B60N 2/5621* (2013.01); *B60N 2/48* (2013.01); *B60N 2/4876* (2013.01); *B60N 2/5635* (2013.01); *B60N 2/5657* (2013.01)

(58) Field of Classification Search
CPC .......................... B60N 2/5628; B60N 2/4876
USPC ....................................................... 297/180.1
See application file for complete search history.

(56) References Cited

U.S. PATENT DOCUMENTS

| | | | | |
|---|---|---|---|---|
| 5,160,517 A | * | 11/1992 | Hicks | A61G 5/10 297/180.14 |
| 5,450,894 A | * | 9/1995 | Inoue | B60H 1/00285 165/43 |
| 6,019,420 A | | 2/2000 | Faust et al. | |
| 6,604,785 B2 | * | 8/2003 | Bargheer | B60H 1/00285 297/180.13 |
| 6,644,735 B2 | * | 11/2003 | Bargheer | B60H 1/00285 297/180.13 |
| 7,467,823 B2 | | 12/2008 | Hartwich | |
| 7,506,924 B2 | * | 3/2009 | Bargheer | B60N 2/4876 297/180.14 |
| 8,167,368 B2 | * | 5/2012 | Eckel | B60H 1/00285 297/180.13 |
| 2002/0041116 A1 | * | 4/2002 | Bogisch | B60J 7/223 297/180.1 |
| 2006/0273646 A1 | * | 12/2006 | Comiskey | A47C 7/74 297/408 |
| 2009/0134675 A1 | | 5/2009 | Pfahler | |
| 2011/0115263 A1 | * | 5/2011 | Bargheer | B60H 1/00407 297/180.13 |
| 2011/0187165 A1 | * | 8/2011 | Oota | B60N 2/5657 297/180.14 |
| 2014/0159442 A1 | * | 6/2014 | Helmenstein | B60N 2/4876 297/180.14 |
| 2014/0179212 A1 | * | 6/2014 | Space | B60N 2/565 454/76 |
| 2015/0118426 A1 | * | 4/2015 | Roberts | B29C 44/18 428/36.4 |
| 2016/0009206 A1 | * | 1/2016 | Perraut | B60N 2/5635 297/180.12 |

* cited by examiner

*Primary Examiner* — Timothy J Brindley
(74) *Attorney, Agent, or Firm* — Gregory P. Brown; Law Firm of Dr. Junqi Hang, PLC

(57) ABSTRACT

According to one or more embodiments, a seat climate control assembly for a seat includes a seatback and a headrest, the seat climate control assembly includes an air intake port positioned on a top portion of the seatback and in fluid communication with the headrest, and an air controller in fluid communication with the air intake port.

16 Claims, 4 Drawing Sheets

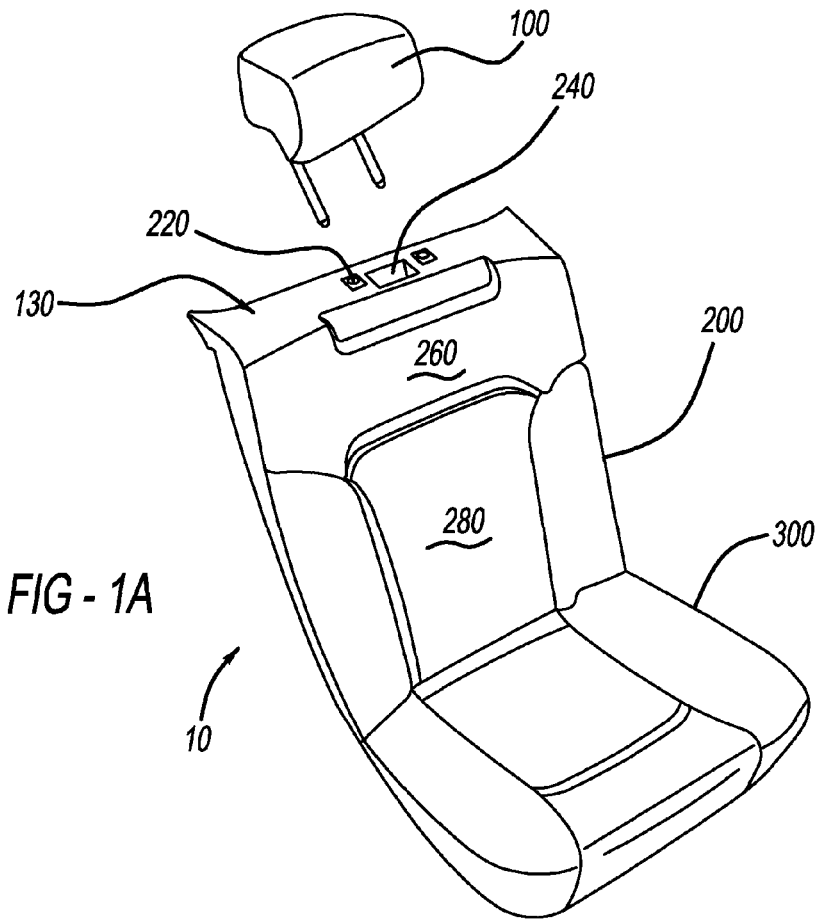
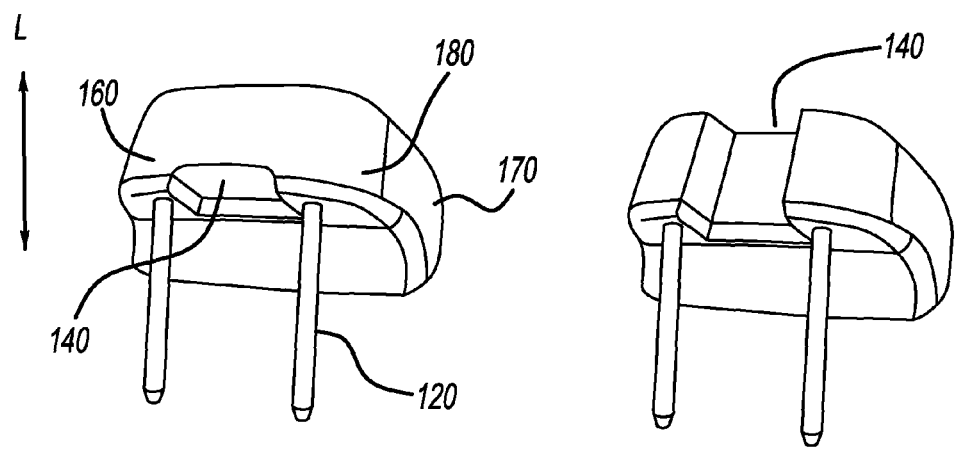

SEAT CLIMATE CONTROL ASSEMBLY AND SEAT EMPLOYING THE SAME

RELATED APPLICATION(S)

This application claims the benefit of Chinese New Invention Patent Application No.: CN201410116863.5, filed Mar. 26, 2014, the entire contents thereof being incorporated herein by reference.

TECHNICAL FIELD

The invention generally relates to the field of seat climate control, and more particularly, relates to a vehicle seat climate control assembly and the seat employing the same.

BACKGROUND

During vehicle operation, passengers often want to feel comfortable in the cabin. In certain existing designs, the thermal comfort is often provided by central HVAC (heating, ventilation and air conditioning) system of the vehicle. The area surrounding passengers may be heated, cooled, or ventilated so as to provide the passengers with desirable comfort.

Certain seat climate control system may currently be available to provide air flow for the back and legs of passengers via ventilating structure. For example, U.S. Pat. No. 7,467,823 or US patent publication 2009/0134675 A1 discloses similar systems.

SUMMARY

According to one or more embodiments, a seat climate control assembly for a seat includes a seatback and a headrest, the sear climate control assembly including an air intake port positioned on a top portion of the seatback and in fluid communication with the headrest, and an air controller in fluid communication with the air intake port.

The headrest may include an upper portion and a lower portion. The lower portion may be positioned between the upper portion and the seatback, and the air intake port may be positioned closer to the lower portion of the headrest than the upper portion of the headrest.

The lower portion of the headrest may include a posterior section and an anterior section. The anterior section may be positioned between the posterior section and an occupant, and the air intake port may be positioned closer to the posterior section than the anterior section of the lower portion of the headrest.

The headrest may define a recess facing the air intake port to be in fluid communication with the air intake port.

The headrest may include a longitudinal axis defining an upper portion and a lower portion. The lower portion may be positioned between the upper portion and the headrest, and the recess may extend along at least 20 percent of the longitudinal axis of the headrest.

The seat climate control assembly may further include an air permeable layer contacting at least a portion of the air intake port.

The recess may be positioned at the posterior section of the headrest.

The air controller may be positioned at an upper portion of the seatback.

The seat may be a rear seat of a vehicle. The seat climate control assembly may further include an air exhaust port positioned at the rear of the seat, and the air controller may be in fluid communication with the air exhaust port.

According to another one or more embodiments, a seat climate control assembly for a seat includes a seatback and a headrest, the seat climate control assembly includes an air intake port positioned on a top portion of the seatback and in fluid communication with the headrest, an air controller in fluid communication with the air intake port, and a ventilating structure positioned in the seatback and in fluid communication with the ventilating structure.

According to another one or more embodiments, a vehicle seat includes a sear climate control assembly described herein elsewhere.

The seat climate control assembly according to the present invention in one or more embodiments is believed to be advantageous at least in being relatively less noisy during operation and more cost effective in manufacture.

The above advantages and other advantages and features will be readily apparent from the following detailed description of embodiments when taken in connection with the accompanying drawings.

BRIEF DESCRIPTION OF THE DRAWINGS

For a more complete understanding of one or more embodiments of the present invention, reference should now be made to the embodiments illustrated in greater detail in the accompanying drawings and described below by way of examples wherein:

FIG. 1A illustratively depicts a vehicle seat according to one or more embodiments;

FIG. 1B illustratively depicts a rear view of a headrest employed in the vehicle seat referenced in FIG. 1A;

FIG. 4 illustratively depicts a rear view of the headrest referenced in FIG. 1B.

DETAILED DESCRIPTION OF ONE OR MORE EMBODIMENTS

Figure 2:
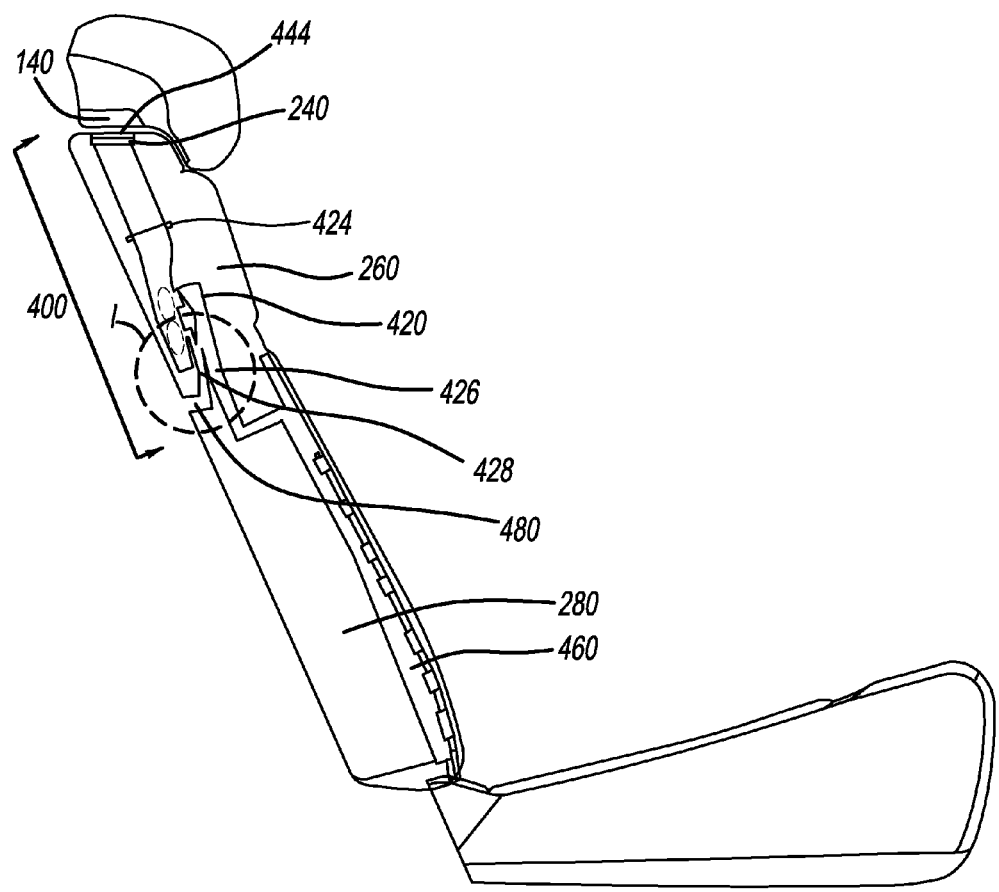
FIG. 2 illustratively depicts a partial side view of the vehicle seat referenced in FIG. 1A.

As referenced in the FIG.s, the same reference numerals refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a seat climate control assembly that can be used in vehicle and seats employed therein. The occupant may accordingly be provided with desirable thermal comfort, and relatively low noise level.

FIGS. 1A, 1B, and 2 collectively and illustratively depict views of the seat climate control assembly 400 for vehicle seat 10 according to one or more embodiments. In one or more embodiments, and as depicted in the Figures, the vehicle seat 10 includes a headrest 100, and a seatback 200, wherein the seat climate control assembly 400 includes an air intake port 240 positioned on a top portion 130 of the seatback 200 and in fluid communication with the headrest 100, and an air controller 420 in fluid communication with the air intake port 240. In particular, as shown in FIG. 2, the top portion 130 is opposite to the headrest 100. In certain instances, the term "top portion" refers to a portion of the seatback 200 that is closest to the headrest 100 in comparison to any other portions of the seatback 200. In certain particular instances, the portion of the seatback 200 that is closest to the headrest 100 is defined by a top end that separates the remainder of the seatback 200 from the headrest 100. Although the top portion 130 is shown as a flat surface, it is to be appreciated that the top portion 130 of the seatback 200 may be designed as cambered surface, step-type surface, etc. in practice.

In one or more embodiments, the seat 10 further includes a seat base 300. The seat base 300 may be mounted on the floor of the vehicle to support the occupant. The seatback 200 may be connected to the seat base 300 to provide support for occupant's back. The headrest 100 is detachably connected to the seatback 200 to provide protection for occupant's head.

As described herein elsewhere, the seat climate control assembly 400 includes an air intake port 240. The air intake port 240 is positioned on the top portion 130 of the seatback 200 and is in fluid communication with the headrest 100. In certain instances, the air intake port 240 is positioned between the seatback 200 and the headrest 100. In certain particular instances, the air intake port 240 is positioned below the headrest 100. These arrangements help reduce the unwanted sound of air flow to provide the occupant with enhanced comfort.

For purposes of illustration, the headrest 100 is depicted as being separate from the seatback 200 in FIG. 1A. Alternatively, the headrest 100 may be connected with the seatback 200. In particular, as illustratively depicted in FIG. 1B, the headrest 100 may include a pair of mounting rod 120, while the seatback 200 includes a pair of mounting hole 220 to respectively receive the mounting rod 120. The mounting rod 120 may be inserted into the mounting hole 220, slide in the mounting hole 220, and/or be secured at a certain position. Thereby, the position of headrest 100 relative to seatback 200 may be adjustable, providing better head protection for occupant.

It is to be appreciated that the headrest and the seatback do not have to be separable from each other. For instance, the headrest may be fixed to the seatback. For instance also, the position of headrest relative to the seatback may be adjustable, but the headrest does not have to be detachable from the seatback. In the event they are connected to each other, the headrest and the seatback may be connected via any suitable ways such as mounting rod/mounting hole, or via other structures known in the field, such as rack and slide/rail.

FIG. 2 depicts a sectional side view of the vehicle seat referenced herein, wherein the seat climate control system 400 arranged in the seatback 200 is shown.

As depicts in FIGS. 1A to 2, there are two mounting holes 220 on the top portion 130 of the seatback 200, while an air intake port 240 is positioned between the mounting holes. It is to be appreciated that the position of the air intake port is shown for illustration, and can be positioned at any other suitable locations, for instance, on one side of the mounting holes such that one mounting hole is positioned between the air intake port and the other mounting hole.

In one example, an air permeable layer is positioned at the location of the air intake port 240. The air permeable layer 444 may contact at least a portion of the air intake port 240. In one embodiment, the air permeable layer 444 covers the air intake port 240, and is connected smoothly to the surface of the top portion 130. In another embodiment, the air permeable layer 444 uses the same material as the surface of the top portion 130, such that occupants will hardly see the opening on the seatback 200, resulting in vehicle interior being more attractive. For example, the air permeable layer 444 may be made of partial perforated leather.

In particular, as depicts in FIG. 1B, the headrest 100 may include a longitudinal axis "L" defining a headrest upper portion 150 and a headrest lower portion 160. The headrest lower portion 160 is positioned between the headrest upper portion 150 and the seatback 200. The air intake port 240 is positioned closer to the headrest lower portion 160 than the headrest upper portion 150. Further, the headrest 100 or the headrest lower portion 160 may include a posterior section 180 and an anterior section 170. The anterior section 170 is positioned between the posterior section 180 and the occupant. The air intake port 240 is positioned closer to the posterior section 180 than the anterior section 170.

In certain embodiments, and as illustratively depicted in FIGS. 1B to 4, the headrest 100 may define a recess 140 facing the air intake port 240 to be in fluid communication with the air intake port 240. As illustratively depicted in FIG. 2, the recess 140 is opposed to the air intake port 240, such that the air near the seat 10 may flow into the air intake port 240 smoothly and enter into the seat climate control assembly 400. Optionally, the recess may be positioned at the posterior section 180. Referring back to FIG. 1B, the recess 140 extends along at least 20 percent of the length of the headrest 100 along the longitudinal axis "L" of the headrest 100. In certain other embodiments, the recess 140 may extend along at least 30%, 40%, 50%, 60%, 70%, 80%, or 90% of the length of the headrest 100 along the longitudinal axis "L". In other words, the length of recess 140 in the direction of axis "L" is at least 30%, 40%, 50%, 60%, 70%, 80%, or 90% of the length of the headrest in the direction of axis "L". It is to be appreciated that the headrest depicted in FIG. 4 is another non-limiting example of the headrest, and the description of headrest with reference to FIG. 1B may similarly apply to the headrest in FIG. 4.

The recess 140 may be of any suitable sizes. In certain embodiments, the recess 140 may have a length extending along the direction of the longitudinal axis "L", the length being of a value no less than 2 centimeters (cm), 4 cm, 6 cm, 8 cm, or 10 cm. In certain other embodiments, the recess 140 may have a width extending vertically to the longitudinal axis "L", the width being of a value no less than 1 cm, 2 cm, 3 cm, 4 cm, or 5 cm.

The seat climate control assembly 400 may further include a ventilation structure 460. In certain embodiments, the ventilation structure 460 is a ventilation pad. The ventilation structure 460 may provide air flow in the seat to take away the heat from occupant, or alternatively provide air flow toward the back and legs of passengers directly. U.S. Pat. No. 7,467,823 B2 and US patent publication 2009/0134675 A1 each disclose certain non-limiting examples of such ventilation structures.

The seat climate control assembly 400 may include an air controller 420. The air controller 420 in turn may include an air inlet 424 and a ventilation outlet 426. In particular, the air inlet 424 may be in fluid communication with the air intake port 240, while the ventilation outlet 426 may be in fluid communication with the ventilation structure 460. U.S. Pat. No. 6,019,420 provides a non-limiting example of such air controller. The air controller may further include an air blower to drive air from the air intake port 240 to flow through the air inlet 424 and the ventilation outlet 426, flowing to the ventilation structure 460.

In one or more embodiments, as illustratively depicted in FIG. 2, the air controller 420 may be positioned at an upper portion 260 of the seatback 200. In particular, the seatback 200 may include a seatback upper portion 260 and a seatback lower portion 280. The seatback upper portion 260 is positioned between the seatback lower portion 280 and the headrest 100. In certain particular embodiments, the seatback upper portion is a portion that does not contact occupant's back, for instance, a portion that corresponds to the neck area of the occupant. Since the air intake port 240 is positioned on the top portion 130 as described above, the distance between the air controller 420 and the air intake port 240 is short, and the air flow path is shortened correspondingly, thereby providing additional cost benefits in manufacturing. Also, since the air controller 420 is positioned at the seatback upper portion 260 that does not contact with the occupant's back, the occupant will feel comfortable while leaning back in the seat 10 because his/her back will not contact with something hard.

Figure 5:
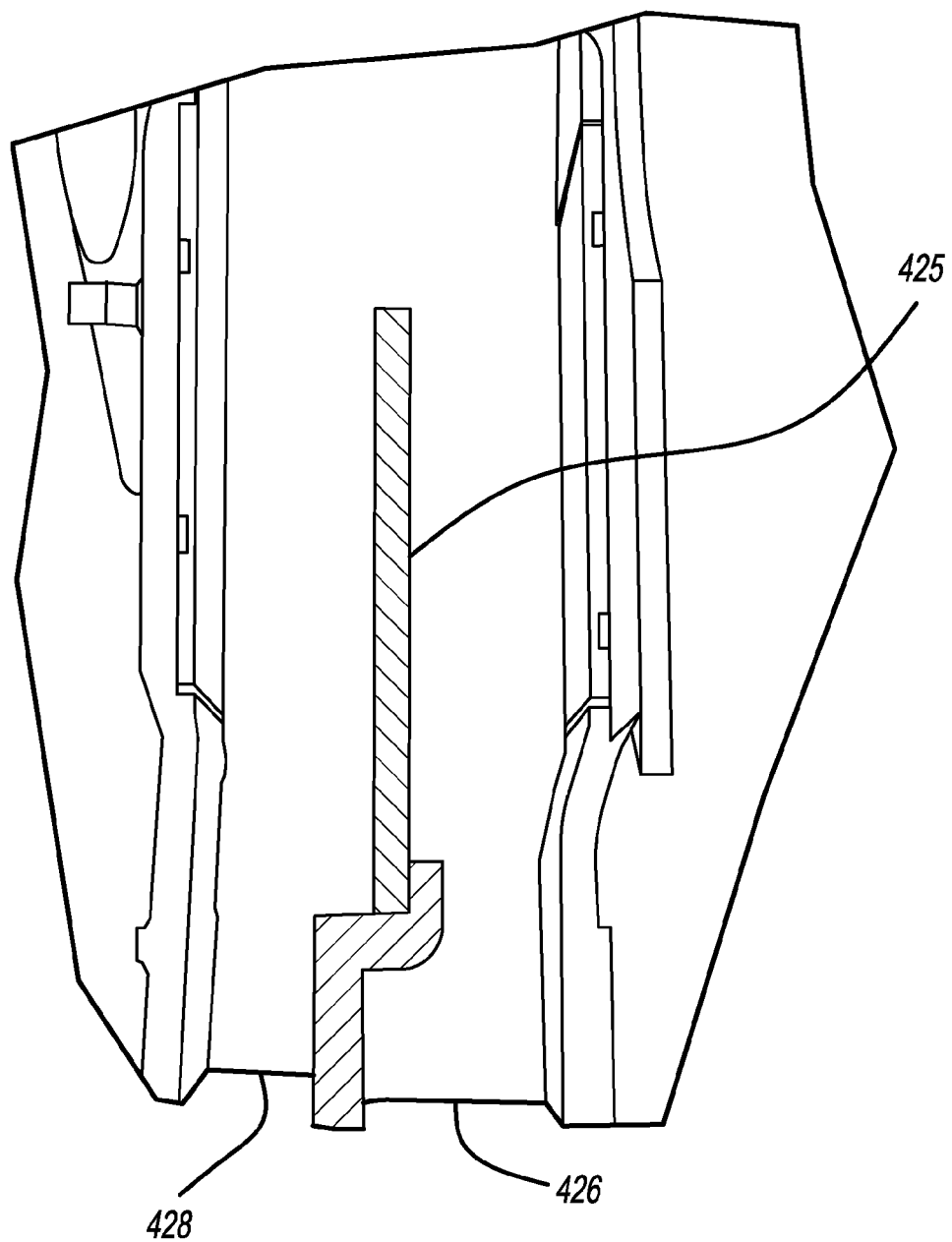
FIG. 5 illustratively depicts an enlarged schematic view of the area "I" referenced in FIG. 2.

Now turning to FIG. 5, it illustratively depicts an enlarged schematic view of the detail I in FIG. 2. In some other embodiments, the air controller 420 may also adjust the temperature. The air controller 420 may further comprise a temperature control module 425 to adjust the temperature of the air flow. In one embodiment, the temperature control module 425 is a Peltier Module that has been known. The air entering the air controller 420 may flow to the ventilation structure 460 via the ventilation outlet 426 after been adjusted by the temperature control module 425. The air controller 420 may further comprise a waste air outlet 428 to direct the waste gas from the temperature control module 425 to the exhaust port 480 of the seat 10 as described below. U.S. reissue patent US RE38,128 E discloses a related system.

As described herein elsewhere, the seat climate control assembly 400 may further include an exhaust port 480, which is in fluid communication with the waste air outlet 428. In one or more embodiments, and as illustratively depicted in FIG. 3, the exhaust port 480 is positioned at the rear of the seat. Optionally, the exhaust port 480 is shown including a plurality of holes on the seatback surface. It is appreciated that the exhaust port 480 may be positioned at other location.

Figure 3:
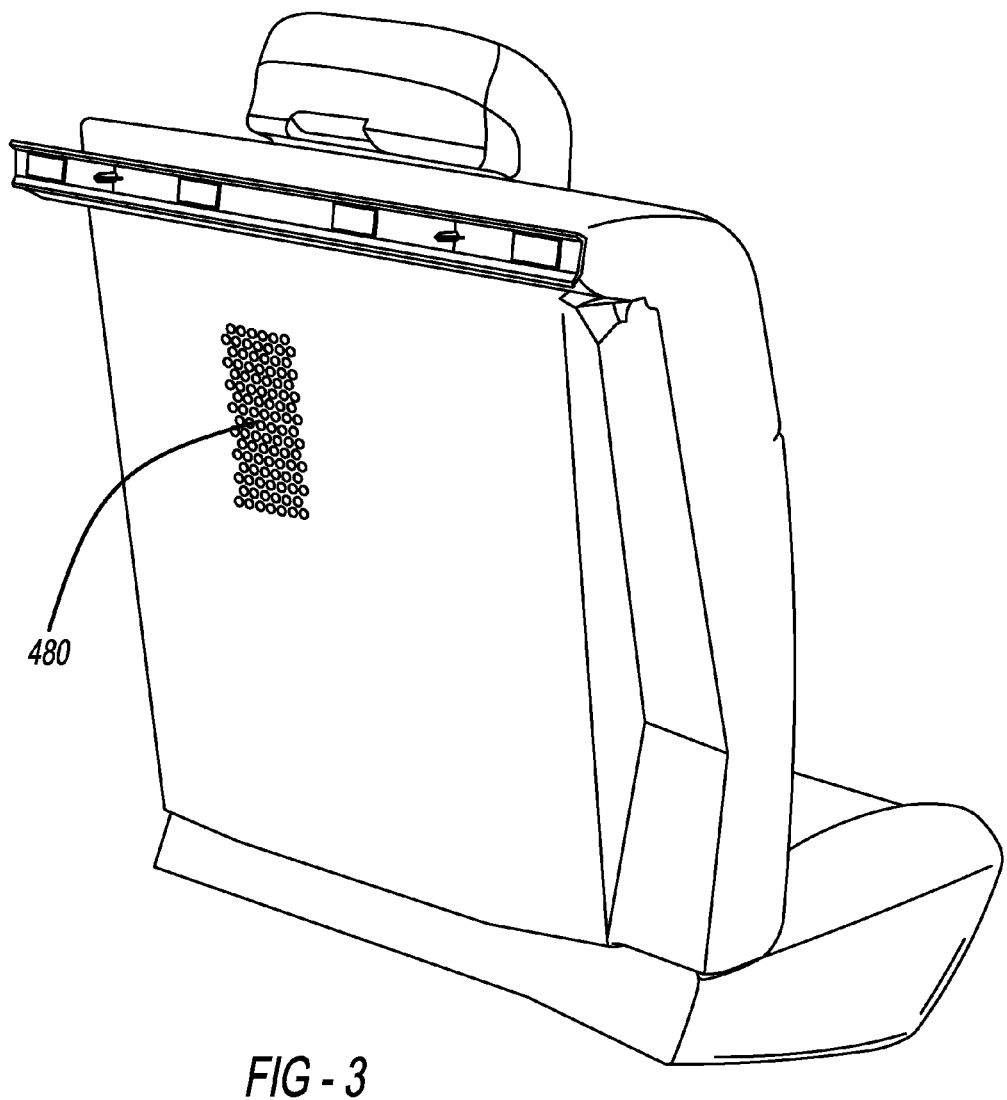
FIG. 3 illustratively depicts a rear view of the vehicle seat referenced in FIG. 1A.

In one or more embodiment, as illustratively depicted in FIGS. 2 and 3, the sear 10 is a rear seat of a vehicle, and in other words, being positioned in a relatively rear portion of the vehicle. Air exhaust may be transported to the luggage storage area at the rear portion of the vehicle via the exhaust port 480 positioned at the rear of the seat, so as to be separate from the occupant. Accordingly, and when cooling air is desirable, the occupant may experience localized cooling at or around his/her back area.

The seat climate control assembly 400 and the seat 10 have been described herein in relation to a vehicle. However, it is to be appreciated that the seat climate control assembly 400 and the seat 10 may be used in non-vehicle applications, such as airplanes, boats and ships, and household chairs.

Example—In one or more embodiments, and according to Computer Aided Engineering (CAE) analysis, the noise level may be reduced to 4.5 sones in comparison to an industry standard of 6.4 sones.

As stated in the specification, the invention provides a seat climate control assembly for vehicle seat and a seat having the same. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A seat climate control assembly of a seat including a seatback, comprising:
   an air intake port positioned on a top portion of the seatback;
   a headrest supported on the seatback with two mounting rods and defining there-between a recess, the recess positioned on a posterior section of the headrest such that air is to enter the air intake port via the recess; and
   an air controller in fluid communication with the air intake port.

2. The seat climate control assembly of claim 1, wherein the headrest includes an upper portion and a lower portion, the lower portion being positioned between the upper portion and the seatback, and the air intake port being positioned closer to the lower portion of the headrest than the upper portion of the headrest.

3. The seat climate control assembly of claim 2, wherein the lower portion of the headrest includes the posterior section and an anterior section, the anterior section being positioned between the posterior section and an occupant, and the air intake port being positioned closer to the posterior section than the anterior section of the lower portion of the headrest.

4. The seat climate control assembly of claim 1, wherein the headrest includes a longitudinal axis defining an upper portion and a lower portion, the lower portion being positioned between the upper portion and the headrest, and the recess extends along at least 20 percent of the longitudinal axis of the headrest.

5. The seat climate control assembly of claim 1, wherein the air controller is positioned at an upper portion of the seatback.

6. A seat climate control assembly, comprising:
   a seat including a seatback;
   an air intake port positioned on a top portion of the seatback;
   an air controller in fluid communication with the air intake port;
   an exhaust port positioned at a rear side of the seatback and in fluid communication with the air controller; and
   a headrest including an upper portion and a lower portion positioned between the upper portion and the seatback and the air intake sort being positioned closer to the lower portion than the upper portion, wherein the headrest includes a posterior section and an anterior section positioned between the posterior section and an occupant, and wherein the headrest further defines a recess positioned at the posterior section of the headrest.

7. The seat climate control assembly of claim 6, wherein the lower portion of the headrest includes the posterior section and the anterior section, the anterior section being positioned between the posterior section and an occupant, and the air intake port being positioned closer to the posterior section than the anterior section of the lower portion of the headrest.

8. The seat climate control assembly of claim 6, wherein the headrest includes a longitudinal axis defining the upper portion and lower portion, the lower portion being positioned between the upper portion and the headrest, and the recess extends along at least 20 percent of the longitudinal axis of the headrest.

9. The seat climate control assembly of claim 6, wherein the air controller is positioned at the upper portion of the seatback.

10. A vehicle seat comprising:
a seatback;
a headrest supported on the seatback with two mounting rods and defining there-between a recess;
an air intake port positioned on a top portion of the seatback, the recess being positioned on a posterior section of the headrest such that air is to enter the air intake port via the recess; and
an air controller in fluid communication with the air intake port.

11. The vehicle seat of claim 10, wherein the headrest includes an upper portion and a lower portion, the lower portion being positioned between the upper portion and the seatback, and the air intake port being positioned closer to the lower portion of the headrest than the upper portion of the headrest, and wherein the lower portion of the headrest includes the posterior section and an anterior section, the anterior section being positioned between the posterior section and an occupant, and the air intake port being positioned closer to the posterior section than the anterior section of the lower portion of the headrest.

12. The vehicle seat of claim 10, further comprising an air exhaust port positioned at a rear side of the seatback and in fluid communication with the air controller.

13. The seat climate control assembly of claim 4, wherein the recess extends along at least 40 percent of the longitudinal axis of the headrest.

14. The seat climate control assembly of claim 6, wherein the headrest is supported on the seatback with two mounting rods, the recess being positioned between the two mounting rods.

15. The seat climate control assembly of claim 14, wherein the recess extends along at least 40 percent of the longitudinal axis of the headrest.

16. The vehicle seat of claim 10, wherein the headrest includes a longitudinal axis defining an upper portion and a lower portion, the lower portion being positioned between the upper portion and the headrest, and the recess extends along at least 40 percent of the longitudinal axis of the headrest.

* * * * *